Oct. 31, 1939.  H. W. LANDENBERGER  2,178,396
APPARATUS FOR FEEDING MATERIALS
Filed Sept. 3, 1936    4 Sheets-Sheet 2

Inventor
Henry W. Landenberger
By Carl F. Sibbr
Attorney

Oct. 31, 1939.  H. W. LANDENBERGER  2,178,396
APPARATUS FOR FEEDING MATERIALS
Filed Sept. 3, 1936  4 Sheets-Sheet 3

Inventor
Henry W. Landenberger
By Carl R. Libbé
Attorney

Oct. 31, 1939.   H. W. LANDENBERGER   2,178,396
APPARATUS FOR FEEDING MATERIALS
Filed Sept. 3, 1936   4 Sheets-Sheet 4

Inventor
Henry W. Landenberger
By Carl F. Sibbe
Attorney

Patented Oct. 31, 1939

2,178,396

UNITED STATES PATENT OFFICE 2,178,396

APPARATUS FOR FEEDING MATERIALS

Henry W. Landenberger, Philadelphia, Pa., assignor to American Engineering Company, Philadelphia, Pa., a corporation of Pennsylvania Application September 3, 1936, Serial No. 99,316

14 Claims. (Cl. 103—45)

This invention relates to apparatus for feeding liquid, plastic, or semi-plastic materials, and more particularly to hydraulic operating mechanisms for such apparatus and the control means therefor.

One object of the present invention is to provide a new and useful apparatus for feeding materials of the stated character at a continuous predetermined rate.

Another object is to provide a highly improved hydraulic mechanism for operating a plurality of material feeding devices in a predetermined sequential order, whereby a continuous flow of material to a receiver is assured.

A further object is to provide a novel pump and motor system for operating the feeding devices having automatic control means associated therewith for controlling the operation thereof.

A still further object is to provide a novel control system for the feeding devices, and the operating means thereof, including a series of automatically operable valves.

Other and further objects will become apparent as the description of the invention progresses.

Of the drawings:

Fig. 2 is an enlarged plan view partly in section of the pumping unit of the apparatus and the control mechanisms associated therewith.

Fig. 7 is a horizontal sectional view taken through one of the automatic air valves of the control mechanism for the apparatus.

Fig. 8 is an elevational view partly in section of the valve shown in Fig. 7.

Fig. 9 is a view partly in section of one of the relief valves shown in Fig. 5.

Fig. 10 is a sectional elevational view of one of the valves for controlling the operation of the motors for operating the feeding devices, and Figs. 11, 12, 13 and 14 are diagrammatic views views partly in section of a portion of the control mechanism showing the automatic control valves in different positions of adjustment.

Figure 1:
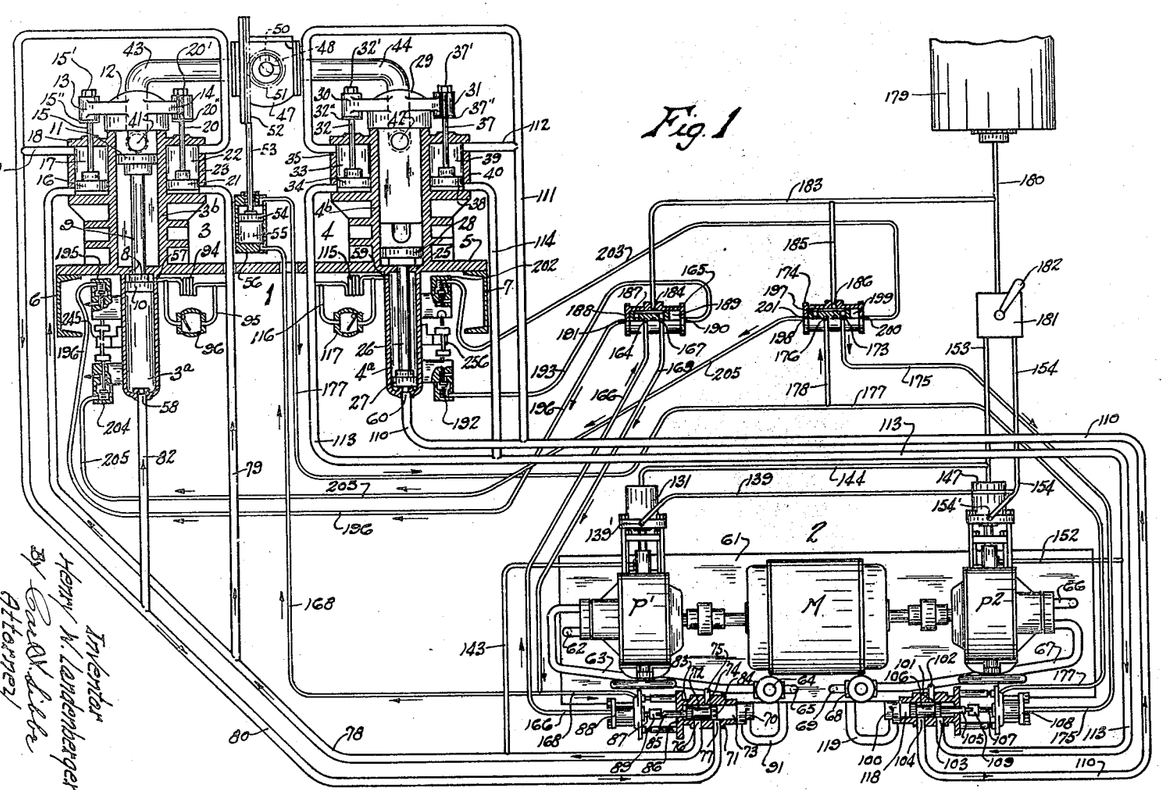
Fig. 1 is a diagrammatic view partly in section of the apparatus comprising the present invention.
Figures 3, 6:
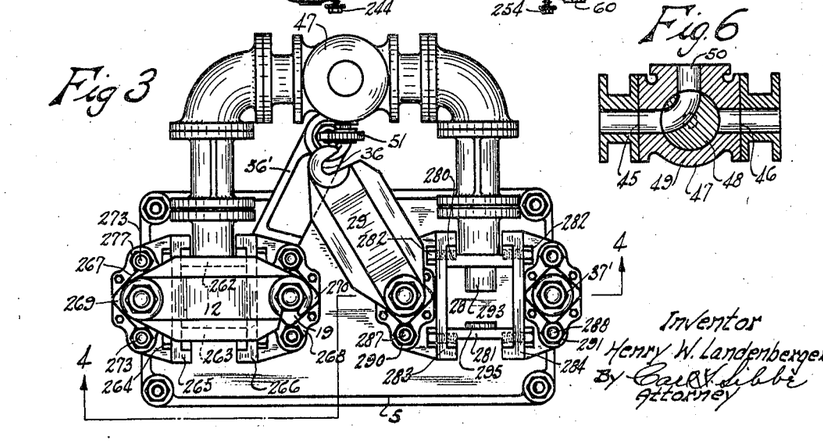
Fig. 3 is a plan view of the material feeding devices.
Fig. 6 is a sectional view of the valve for controlling the flow of materials from the feeding devices.
Figure 4:
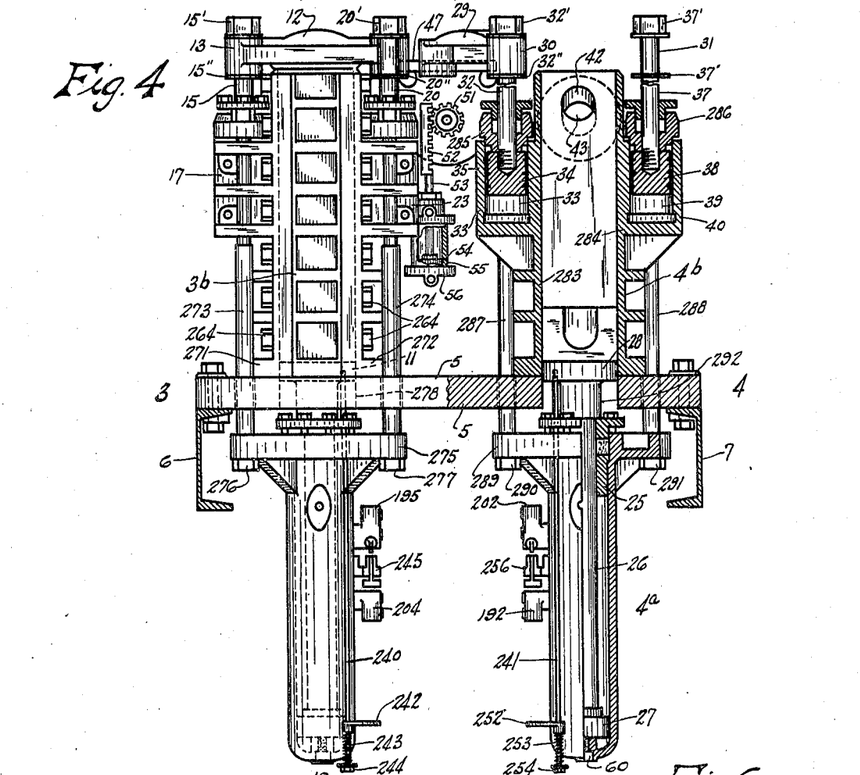
Fig. 4 is an elevational view partly in section taken substantially along line 4—4 of Fig. 3, showing the operating motors for the feeding devices.

Referring to the drawings, the numeral 1 designates generally the material feeding end of the apparatus operated in the present instance by a pumping unit 2, and comprising a pair of substantially vertical units 3 and 4 mounted upon a base 5, which in turn is supported upon a pair of channel beams 6 and 7. Unit 3 is provided with a partition 8 intermediate the ends thereof, through which extends a piston rod 9. Secured to the lower end of rod 9 and extending beneath partition 8, is a piston 10 of substantially cylindrical construction which operates in the lower cylindrical section $3^a$ of unit 3. The upper end of rod 9 has also secured thereto a piston 11 which in the present instance is substantially square in cross section and operates in the correspondingly shaped upper section $3^b$, which constitutes the receiving chamber of unit 3 for the materials. The upper end of section $3^b$ during operation of pistons 10 and 11 in the feeding direction, is closed by a lid 12. Secured to and extending laterally from lid 12 are a pair of extensions 13 and 14. Extension 13 is provided with a vertical aperture through which extends the upper reduced end of a piston rod 15. The lower end of rod 15 has secured thereto a piston 16 which operates in the cylinder 17 of a fluid motor 18. Extension 14 is provided with a hook 19 (Fig. 3) for receiving the upper reduced end of a piston rod 20. Rod 20 has secured to the lower end thereof a piston 21 which operates in the cylinder 22 of a second fluid motor 23. Cylinders 17 and 22 in the present instance are cast integral to the opposite sides of section $3^b$, as shown in Figs. 1 and 4. Lid 12 is held against upward movement on rods 15 and 20 by nuts 15' and 20' and against downward movement relative to said rods by a pair of collars 15'' and 20'' respectively, secured to rods 15 and 20 in any suitable manner. Unit 4 is similar in construction to unit 3, and also has provided intermediate the ends thereof a partition 25 which divides the same into a lower section $4^a$ and an upper section $4^b$, and through which extends a piston rod 26. Secured to the opposite ends of rod 26 are pistons 27 and 28, which operate respectively in the lower, substantially cylindrical section $4^a$, and the upper, substantially square material receiving section $4^b$. The upper end of section $4^b$ may be closed by a lid 29 having extensions 30 and 31 provided respectively at the opposite ends thereof. Extension 30 is provided with a substantially vertical aperture which receives a piston rod 32 extending through the upper end of cylinder 33. The lower end of rod 32 has secured thereto a piston 34 which operates in the cylinder 33 of a fluid motor 35. Extension 31 is of hook-like construction, as shown at 36, and receives the upper end of a second piston rod 37. The lower end of piston rod 37 has secured thereto a piston 38 which operates in a cylinder 39 of a second fluid motor 40. Lid 29 is held against upward movement on rods 32 and 37 by nuts 32' and 37', and against downward movement relative to said rods by collars 32" and 37".

The upper ends of sections 3$^b$ and 4$^b$ are provided with discharge ports 41 and 42 respectively, to which are connected one end of pipes 43 and 44. The opposite ends of pipes 43 and 44 are connected to ports 45 and 46 of a three-way valve 47. Valve 47 comprises a cylindrical valve member 48 which operates in the cylindrical bore of the valve casing 49. The valve casing is also provided with a discharge port 50. Thus when valve 48 is in the position shown in Fig. 6, communication is established between pipe 43, port 45 and discharge port 50. The solid portion of valve member 48 when in this position closes port 46. When valve member 48 is rotated to a second position of adjustment communication is established between pipe 44, port 46, and discharge port 50, while the solid portion thereof closes port 45. Valve member 48 has secured thereto exteriorly of the valve casing a gear 51 which meshes with a rack 52, secured to the piston rod 53 of a piston 54 operating in the cylinder 55 of a fluid motor 56 secured in any suitable manner to a bracket 56' extending laterally from section 3$^b$ (Fig. 3). Thus when piston 54 is actuated to one position of adjustment communication is established between discharge port 50, of valve 47, and pipe 43, and when said piston is actuated in the reverse direction, communication is established between discharge port 50 and pipe 44. The upper and lower ends of section 3$^a$ of unit 3 are provided with ports 57 and 58 respectively, through which fluid under pressure from pumping unit 2 is adapted to pass during operating periods. The upper and lower ends of section 4$^a$ are likewise provided with ports 59 and 60 through which fluid under pressure from the pump unit 2 may also pass.

Pumping unit 2 comprises a pair of pumps P$^1$ and P$^2$ driven in the present instance by an electric motor M. These pumps are of a well known construction, and for a complete description thereof reference may be had to United States Patent No. 1,077,979. Fluid is drawn into pump P$^1$ from a supply tank 61 through a pipe 62 and discharges under pressure therefrom through a pipe 63. The other end of pipe 63 is connected to a relief valve 64 of any suitable construction, and a pipe 65 connects relief valve 64 with supply tank 61. Pump P$^2$ also receives its fluid from supply tank 61 through a pipe 66 and discharges fluid under pressure through a pipe 67. The other end of pipe 67 is connected to a relief valve 68 and a pipe 69 connects relief valve 68 with supply tank 61. Pipe 63 is connected to a four-way valve 70 which in the present instance comprises a casing 71 having a valve member 72 operating in the central chamber 73 thereof. Valve casing 71 has provided therein an inlet port 74 which is connected to pipe 63 by a pipe 75, and discharge ports 76 and 77.

Figures 2, 7, 8, 9, 10, 11:
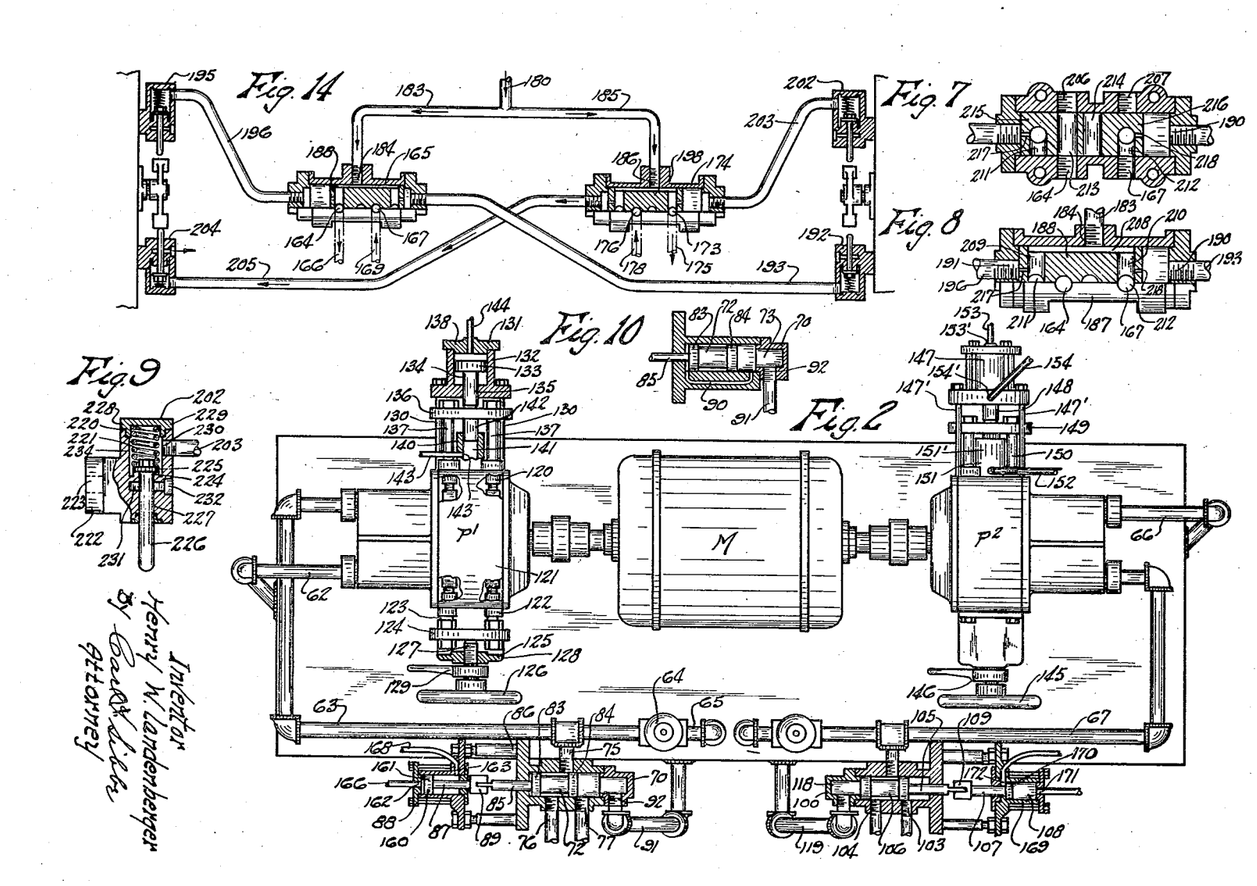

Ports 76 of valve 70 is connected to the lower end of cylinder 17 of motor 18 by means of a pipe 78, while a branch pipe 79 connects pipe 78 with the lower end of the cylinder 22 of fluid motor 23. Port 77 of valve 70 is connected to the upper end of cylinder 22 of motor 23 by means of a pipe 80, while branch pipes 81 and 82 connect pipe 80 with the upper end of cylinder 17 of motor 18, and the port 58 of section 3$^a$ of unit 3, respectively. Valve member 72, as will be seen upon reference to Figs. 1 and 2, comprises a pair of interconnected valve heads 83 and 84. A stem 85 is secured to one end of valve member 72 and extends through the end wall 86 of casing 71 and is operatively connected to the piston rod 87 of a fluid motor 88 by any suitable coupling means 89. Motor 88 is provided to shift valve member 72, as will appear more fully hereinafter. Referring more particularly to Fig. 10, it will be seen that the opposite ends of the central chamber 73 of valve 70 are connected by means of a passage 90, which communicates with a fourth port 92 of said valve, while a pipe 91 connects port 92 with supply tank 61.

When valve member 72 is in the position shown in Figs. 1 and 2, fluid from pump P$^1$ enters port 74 through pipes 63 and 75, and then flows into chamber 73 between valve heads 83 and 84, and into pipe 78 through port 76, and thence to the lower end of cylinders 17 and 22 of motors 18 and 23 respectively, through pipe 78 and branch pipe 79. Fluid in the upper ends of cylinders 17 and 22 of motors 18 and 23 will now flow through branch pipe 81, pipe 80, port 77, valve chamber 73, port 92, and thence to supply tank 61 through pipe 91. Fluid in the lower end of section 3$^a$ of cylinder 3 will also flow to supply tank 61 through pipes 82, 80, port 77, chamber 73, port 92 and pipe 91.

Referring to Fig. 1, it will be noted that port 48 57 at the upper end of section 3$^a$ is connected to pipe 79 by a choke coil 94. Thus when fluid under pressure passes to the lower ends of cylinders 17 and 22 through pipes 78 and 79, pressure will also be exerted against the upper end of piston 19, thereby urging the same downwardly, after pistons 16 and 21 have raised lid 12 to inoperative position. Piston 19 would ordinarily move downwardly by gravity, but in order to insure raising of lid 12 before downward movement of piston 19 is effected, the choke coil 94 is provided. When piston 19 moves upwardly in order to prevent any resistance to the escape of fluid from the upper end of section 3$^a$ a bypass connection 95, having a check valve 96 provided therein, is connected across the coil section of choke coil 94.

The discharge pipe 67 of pump P$^2$ is also connected to a four-way valve 100, similar in construction and operation to the valve 70 just described. Valve 100 also comprises an inlet port 101 which is connected to pipe 67 by means of a pipe 102, and discharge ports 103 and 104. The valve stem 105 of the valve member 106 operating in valve 100 is operatively connected to the piston rod 107 of a fluid motor 108 by any suitable coupling 109. Port 104 of valve 100 is connected to the port 60 of section 4$^a$ of unit 4, by means of a pipe 110, and to the upper ends of cylinders 33 and 39 of motors 35 and 40, by means of branch pipes 111 and 112. Port 103 is connected to the lower end of cylinder 33 by means of a pipe 113, while a branch pipe 114 connects pipe 113 with the lower end of cylinder 39. Port 59 provided at the upper end of section 4$^a$ is connected to pipe 113 by means of a choke coil 115, and a bypass connection 116 having a check valve 117 provided therein, is connected across said choke coil.

The opposite ends of the chamber 118 of valve 100 are connected by a passage similar to the passag 90 of valve 70, and a pipe 119 connects said chamber with makeup tank 61. When the parts are in the position shown in Figs. 1 and 2, fluid from the pump P² flows through pipes 67, 102, port 101, the portion of chamber 118 between the valve heads of valve member 106, port 104, pipe 110, port 60 at the lower end of section 4ᵃ, and through pipe 111 to the upper end of cylinder 33, and through branch pipe 112 to the upper end of cylinder 39. When this occurs pistons 34 and 38 will move downwardly to clamp lid 29, while pistons 27 and 28 will be moved upwardly to feed the material contained in section 4ᵇ to valve 37. Fluid at the upper end of section 4ᵃ will now pass through bypass connection 116, pipe 113, port 103, chamber 118, and thence to makeup tank 61 through pipe 119. Fluid at the lower ends of cylinders 33 and 39 will now also flow to supply tank 61 through pipes 113 and 114, port 103, chamber 118, and pipe 119.

Pumps P¹ and P² are generally similar in construction and each comprises sliding blocks 120 for controlling the strokes thereof. These pumps are so constructed that stroking thereof will occur in one direction only from a neutral position, and consequently the discharges thereof will always be through pipes 63 and 67 respectively.

Secured to sliding blocks 120 and extending through suitable bearings in the casing 121 of pump P¹ are a pair of guide rods 122. These guide rods are secured at the outer ends thereof by any suitable means, such as lock nuts 123, to a crosshead 124. Mounted in a bracket 125 extending outwardly from pump casing 121 is a hand wheel 126 having a screw shaft 127 secured thereto. Screw shaft 127 engages the internally threaded bore provided in the end wall 128 of bracket 125, and the end thereof is adapted to engage the outer side of crosshead 124. Thus in order to limit the stroke of the pump to best suit the conditions of operation, it is only necessary to turn hand wheel 126 the proper amount. Upon adjustment of hand wheel in this manner it is secured in position by a lock nut 129. Rigidly mounted on a pair of rods 130 secured at one end to the opposite side of pump P¹ is a fluid motor 131. Motor 131 comprises a cylinder 132 having a piston 133 operating therein. A piston rod 134 is secured at one end thereof to piston 133 and extends through the inner wall 135 of cylinder 132. The other end of rod 134 is secured to the outer side of a crosshead 136, which in turn is secured to the outer ends of a pair of guide rods 137. The inner ends of guide rods 137 are secured to sliding blocks 120 at the side opposite to that forming the points of attachment of rods 122. To place pump P¹ on stroke fluid is admitted to a port 138 provided in the outer end of cylinder 132 through a pipe 144, causing piston 133 to actuate crosshead 136 inwardly. Inasmuch as crosshead 124 is rigidly secured to sliding blocks 120 it also will move in the same direction until it engages the inner end of shaft 127. When it is desired to place pump P¹ on neutral stroke fluid is admitted to a port 139' provided at the inner end of cylinder 132 through a pipe 139 whereby the piston 133 is operated in the reverse direction, thereby moving sliding blocks 120 to neutral position. In order to prevent excessive pressures in the system when pistons 10 and 11 reach their lower limit of travel and pistons 16 and 21 reach their upper limit of travel, a second fluid motor 140 is provided. Motor 140 is secured in any suitable manner to the side of the casing 121 of pump P¹ adjacent motor 131. Motor 140 comprises a cylinder 141 having a piston 142 operating therein. The outer end of piston 142 engages the inner side of crosshead 136. The cylinder 141 of motor 140 is provided with a port 143 at the inner end thereof which is connected to pipe 78 by means of a branch pipe 143'. Thus, in the event the pressure in the system exceeds that imposed upon the outer side in piston 133 of motor 131, under the conditions just described, piston 142 operating in opposition thereto will actuate crosshead 136, and consequently sliding blocks 120, to a neutral position.

Pump P² is also provided with a similar control mechanism consisting of a stroke determining hand wheel 145, which is locked in position after adjustment by a lock nut 146. The opposite side of pump P² has secured to the casing thereof a pair of rods 147' upon which is mounted a motor 147 for actuating the sliding blocks 120 of said pump to on-stroke position and to neutral position. The piston rod 148 of motor 147 is secured to a crosshead 149, which in turn is secured to the sliding blocks of the pump by means of guide rods 150. To prevent excessive pressures in the system when pistons 27 and 28 reach the limit of their downward travel, and pistons 34 and 38 reach their upper limit of travel, a second motor 151 is provided. Motor 151 comprises a cylinder 151' having a piston 155 operating therein, the inner end of said cylinder being connected to pipe 113 by a pipe 152. In order to stroke pump P² fluid under pressure is admitted to a port 153' at the outer end of motor 147 through a pipe 153, and to adjust the stroke controls of said pump to neutral position fluid is admitted to a port 154' at the opposite end of motor 147 through a pipe 154. In the event the pressure in the system exceeds a predetermined value under the conditions just described the piston 155 of motor 151 operates against the action of motor 147 to move crosshead 149, as well as the sliding blocks of pump P² to neutral position.

Turning now to the valves 70 and 100 associated with pumping unit 2, it will be recalled that said valves are shifted to different positions of adjustment by means of fluid motors 88 and 108 respectively. Motor 88 comprises a cylinder 160 having a piston 161 operating therein to one end of which the piston rod 87 is secured. Fluid is supplied to the left hand end of cylinder 160 through a port 162 and to the right hand end thereof through a port 163. Port 162 of motor 88 is connected to a port 164 of a control valve 165 by means of a pipe 166, while port 163 is connected to a port 167 of valve 165, by means of a pipe 168 and a branch pipe 169. The other end of pipe 168 is connected to the lower end of cylinder 55 of the motor 56 for adjusting valve 47.

Motor 108 is similar in construction to motor 88 and comprises a cylinder 169 having a piston 170 operating therein, to one end of which the piston rod 107 is attached. Fluid enters the right hand end of cylinder 169 through a port 171 and the left hand end thereof through a port 172. Port 171 is connected to a port 173 of a second control valve 174 by means of a pipe 175. Port 172 is connected to a port 176 of valve 174 by means of a pipe 177 and a branch pipe 178.

The opposite end of pipe 177 is connected to the upper end of cylinder 55 of motor 56.

Motors 56, 131, 147, 88 and 108 are actuated by any suitable fluid pressure, such as air, delivered from a pressure tank 179. A pipe 180 connects pressure tank 179 with a manually operable valve 181. Valve 181 is so constructed that when the handle 182 thereof is in one position, fluid under pressure passes through pipe 153 and branch pipe 144 to the outer ends of the pistons operating in motors 131 and 147 respectively, whereby the sliding blocks of pumps $P^1$ and $P^2$ are actuated to on-stroke position. When handle 182 is moved to another position of adjustment, fluid under pressure passes from valve 181 to pipe 154. Since pipe 139, as shown more particularly in Fig. 1, is connected to pipe 154 fluid now enters the inner ends of motors 131 and 147 causing the pistons operating therein to actuate the sliding blocks of pumps $P^1$ and $P^2$ to neutral position. As shown in Fig. 1, a pipe 183 is connected at one end to pipe 180, and at the other end to the inlet port 184 of valve 165, while a branch pipe 185 connects pipe 183 to the inlet port 186 of valve 174.

Valve 165 comprises a casing 187 having a slidable valve member 188 operating in the central chamber 189 thereof. Valve casing 187 has provided therein a port 190 at the right hand thereof, and a port 191 at the left hand end thereof. Port 190 is connected to the lower end of a relief valve 192, secured to the lower end of section $4^a$ of unit 4, by means of a pipe 193, while port 191 is connected to a relief valve 195 suitably secured to section $3^a$ of unit 3, by means of a pipe 196.

Valve 174 is similar in construction to valve 165, and also comprises a substantially cylindrical casing 197 having a slidable valve member 198 operating in the central chamber 199 thereof. Ports 200 and 201 are provided respectively in the right and left hand ends of casing 197. Port 200 is connected to a relief valve 202 secured to section $4^a$ of unit 4 above valve 192, by means of a pipe 203, while port 201 is connected to a relief valve 204 secured to section $3^a$ of unit 3 beneath valve 195 by means of a pipe 205.

The structure and operation of valves 165 and 174 are similar so that a detailed description of one will suffice for both. Therefore, a detailed description of valve 165 only will be given.

Referring more particularly to Figs. 7 and 8, it is seen that casing 187 has provided therein diametrically opposed to ports 164 and 167, ports 206 and 207, respectively. These ports constitute the exhaust ports of the valve, as will appear more fully hereinafter. Valve member 188 has provided at the upper side thereof, a longitudinal passage 208 which communicates with radial passages 209 and 210 provided respectively near the opposite ends of said member. Passages 209 and 210 communicate respectively with radial passages 211 and 212 disposed substantially at right angles thereto, and which are adapted to register with ports 164 and 167 respectively, provided in casing 187. Valve member 188 has also provided therein intermediate passages 211 and 212, a pair of passages 213 and 214, extending transversely through said valve member and in substantially parallel relation with passages 211 and 212. The opposite ends 215 and 216 of valve member 188 are connected to passages 209 and 210 respectively, by relatively small passages 217 and 218. Thus, when relief valves 192 and 195 are closed, equal pressures are exerted at the opposite ends 215 and 216 of valve member 188. However, in the event, for example, valve 192 should be opened thereby connecting the right hand end 216 of valve member 188 to exhaust, the pressure exerted on the left hand end 215 thereof will shift the valve member to the right. The same is true in the event valve 195 should be opened while valve 192 is closed; the pressure exerted on the end 216 of valve member 188 will then cause the latter to be shifted to the left, as shown in Fig. 7. When valve member 188 is in the position shown in Figs. 7 and 8, fluid from pipe 183 enters inlet port 184 and then flows through longitudinal passage 208 through passages 209 and 211, and the passages 210 and 212. When in this position passage 212 registers with port 167, and consequently fluid will flow from said port through pipe 169 and pipe 168 to the right hand end of motor 88, thereby shifting valve member 72 to the left, and also to the lower end of motor 56, causing the piston operating therein to move rack member 52 upwardly, which through its engagement with gear 51, will shift valve member 48 so as to establish communication between pipe 44 and discharge port 50. The fluid at the left hand end of motor 88 will now flow through pipes 166, port 164, passage 213 provided in valve member 188, and thence to exhaust through port 206. When valve member 188 is shifted to the extreme right hand position it is seen that passage 214 will connect port 167 with exhaust port 207, while passage 211 will register with port 164. Passage 212 under these conditions will be covered by the inner surface of the cylinder. Fluid entering the valve through pipe 183 will now flow through passages 208, 209, and 211 of valve member 188, port 164, pipe 166, and into the left hand end of cylinder 160 of motor 88, thereby shifting valve member 72 to the right. Fluid from the right hand end of motor 88, as well as fluid from the lower end of motor 56 will now flow through pipe 168, branch pipe 169, port 167, passage 214 of valve member 188, and thence to exhaust through port 207.

Relief valves 192, 195, 202, and 204 are of similar construction, and accordingly a detailed description of one will suffice for all. For the purpose of illustration, a description of valve 202 will now be given. Valve 202 comprises a casing 220 having a substantially cylindrical chamber 221 provided therein. The left hand side of casing 220 is provided with a pair of laterally extending ears 222, each having an aperture 223 provided therein through which a bolt, or other securing means may pass for securing said valve to unit 4. The lower end of chamber 221 is provided with a valve seat 224 upon which rests a valve 225. The valve stem 226 of valve 225 extends through a central bore 227 provided in the casing and protrudes from the outer extremity of the casing. The upper end of casing 220 is provided with an internally threaded portion 228 for receiving a cap member 229. The right hand side of chamber 221 has provided therein a port 230 to which is secured one end of pipe 203. Slightly below valve seat 224 is a second chamber 231 which communicates with an exhaust port 232. Thus, when valve 225 is moved away from its seat, fluid from pipe 203 will flow into chamber 221, thence around valve stem 226 and into chamber 231, and thence to exhaust through port 232. Valve 225 is retained upon its seat by means of a coil spring 234 extending between the head of valve 225 and the inner surface of cap 229. The compression of spring 234 may be varied by simply adjusting cap 229.

The means for actuating relief valves 192, 195, 202 and 204, which control the operation of valves 165 and 174 will now be described in detail.

Figure 5:
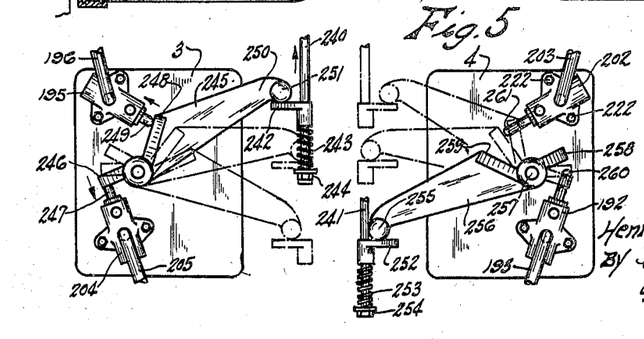
Fig. 5 is a detail view of the relief valves and the tripping mechanisms therefor associated with the control mechanism for the apparatus.
Figure 11:
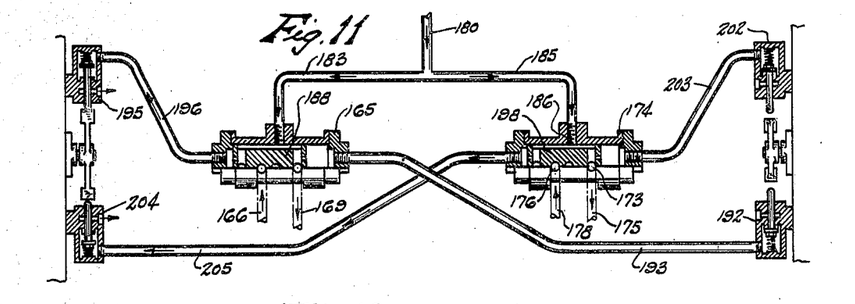

Referring more particularly to Figs. 4 and 5, it is seen that pistons 11 and 28 of units 3 and 4, have respectively secured thereto rods 240 and 241. Rod 240 has slidably mounted thereon near the lower end thereof a laterally extending projection 242. Projection 242 rests upon the upper end of a coil spring 243 extending between said projection and an adjustable nut 244 provided at the lower end of said rod. Pivotally mounted intermediate valves 195 and 204 on unit 3 is a tripping element 245. Element 245 comprises an arm 246 adapted to engage the upper end of valve stem 247 of valve 204, a second arm 248 adapted to engage valve stem 249 of valve 195, and a relatively long arm 250 having a laterally extending projection 251 thereon adapted to be engaged by projection 242 as piston 11 approaches its upper limit of travel. Thus, as piston 11 approaches its upper limit of travel projection 242 engages arm 250 and rotates the same in a counterclockwise direction (Fig. 5), causing arm 246 to engage valve stem 247, thereby opening valve 204 to relieve the pressure at the left hand end of valve member 198, and as a result valve member 198 moves to the left. Upon continued movement of piston 11, arm 248 of tripping element 245 engages valve stem 249 of valve 195, thereby also opening said valve, and relieving the pressure at the left hand end of valve member 188, whereupon the latter moves to the left.

Rod 241 secured to piston 28 has also provided at the lower end thereof the laterally extending projection 252 resting upon the upper end of a coil spring 253 extending between the projection 252 and an adjustable nut 254 provided at the extreme lower end of said rod 241. Projection 252 is adapted to engage a lateral projection 255 secured to the free end of a tripping element 256 pivotally mounted on unit 4 at 257. Tripping element 256 has also provided thereon a pair of arms 258 and 259, which are adapted to engage valve stems 260 and 261 respectively, of valves 192 and 202. Thus, as piston 28 approaches its upper limit of travel, projection 252 engages tripping element 256, causing the same to swing in a clockwise direction (Fig. 5) whereby arm 258 engages valve stem 260 to open valve 192, thereby relieving the pressure at the right hand end of valve member 188, and consequently the latter moves to its right hand position of adjustment. Upon further movement of piston 28, arm 29 of tripping element 256 engages valve stem 261 and opens valve 202, thereby causing a reduction in the pressure at the right hand end of valve member 198, whereupon the latter moves to its right hand position of adjustment. Springs 243 and 253 provide resilient mountings for the projections 242 and 252 respectively, and thereby prevent damage to the parts, should rod 240 or 241, for any reason, overtravel its normal limit of movement. The pressure of springs 243 and 253 may be varied by simply adjusting nuts 244 and 254 respectively.

During the upward travel of pistons 27 and 28 valve 192 is opened prior to the opening of valve 202, thereby causing an adjustment of valve 165 to effect a shifting of valve member 72 of valve 70, so that fluid from pump P¹ will cause lid 12 to close the open end of unit 3ᵇ, and pistons 10 and 11 to move upwardly before pistons 27 and 28 complete their travel in the feeding direction and before valve 47 has been shifted to connect the discharge port thereof with inlet port 41. The purpose of this is to cause a compression of the material in the receiving chamber of unit 3 before it is fed therefrom, and as a result continuous feeding of materials of a uniform density is assured. The same is true in respect to valves 204 and 195, the former of which being opened first as pistons 10 and 11 approach their limit of travel in the feeding direction, thereby causing an adjustment of valve member 198 of valve 174 in such a manner that valve element 106 of valve 108 will be shifted to the left so that fluid motors 35 and 40 will urge lid 29 downwardly to close the open end of the receiving chamber of unit 4, and also to effect an initial upward movement of pistons 27 and 28 to compress the materials contained in said chamber before pistons 10 and 11 complete their travel in the feeding direction.

Referring more particularly to Figs. 3 and 4, it will be observed that sections 3ᵇ and 4ᵇ of units 3 and 4 respectively, may be of a fabricated design, especially when the receiving chambers are of a rectangular form. Section 3ᵃ comprises a pair of end walls 262 and 263 to which are secured by stud bolts 264, a pair of side plates 265 and 266, having the cylinders 17 and 22 respectively, integrally cast thereto. The upper ends of cylinders 17 and 22 are closed by means of cap members 267 and 268 respectively through which the piston rods 15 and 20 extend. To prevent leakage past the piston rods 15 and 20, any suitable packing glands 269 and 270 may be provided. Section 3ᵇ is supported upon platform 5 by flanges 271 and 272 provided at the lower ends of side plates 265 and 266. Unit 3 is secured to platform 5 by means of four elongated bolts 273 and 274, which extend through the opposite ends of cap members 267 and 268 respectively. These bolts also extend through apertures provided in platform 5, and the lower ends thereof are secured to the upper flange 275 of section 3ᵃ. Nuts 276 and 277 secured to the opposite ends of rods 273 and 274 rigidly hold the parts in position. Platform 5 is provided with an aperture 278 through which piston 11 is adapted to pass. By this construction it is seen that the various elements comprised in unit 3 may be readily assembled in position. Section 4ᵇ of unit 4 is of similar construction and comprises end plates 280 and 281, to which are secured, by stud bolts 282, a pair of side plates 283 and 284. The upper ends of cylinders 33 and 39 provided on plates 283 and 284 respectively are closed by caps 285 and 286, through the opposite ends of which elongated bolts 287 and 288 extend. Bolts 287 and 288 also extend through apertures provided in platform 5 and in the upper flange 289 of section 4ᵃ. The parts above described are rigidly held in position by nuts 290 and 291 secured to the opposite ends of said bolts. Piston 28 is adapted to extend through an aperture 292 provided in platform 5, in alignment with the receiving chamber of section 4ᵇ. As shown in Figs. 3 and 4, piston 28 is provided with a U-shaped depression 293, which is adapted to register with discharge port 42 of section 4ᵇ when said piston is in its upper position. By this construction piston 28 will continue to feed materials through the discharge port 43 during its entire movement in the feeding direction. To prevent binding of piston 28 in the chamber in which it operates due to depression 293, a second and correspondingly shaped depression 295 is provided at the opposite side of said piston. The forces operating on the opposite sides of the piston during its operation are balanced, and binding thereof is thus prevented. Piston 11 of section 3ᵇ is of similar construction From the foregoing description it is believed that the operation of my improved apparatus is apparent. However, in order to correlate the various elements thereof a brief résumé of the operation of the apparatus as a whole will now be given.

Fig. 1 shows the positions of the various parts when piston 11 of the feeding unit 3 has reached its upper limit of travel. At this time the receiving chamber of unit 4 has been loaded with a charge of materials, and the feeding thereof through discharge port 42 has just begun. It will be noted that valve elements 188 and 198 of valves 165 and 174 respectively, are now in their left hand positions of adjustment, and consequently fluid under pressure from tank 179 enters port 184 of valve 165 and discharges from said valve through port 167 and into pipe 169, and thence flows to port 163 of motor 88, causing the piston 161 thereof to actuate valve element 72 of valve 70 to the left. Fluid under pressure also flows to the lower end of motor 55, causing the piston thereof to actuate valve element 48 of valve 47 to a dotted line position, shown in Fig. 1, thereby establishing communication between pipe 44 and discharge port 50 of said valve. When the parts are in this position fluid under pressure from tank 179 flowing through pipes 180, 183, 185, ports 186 and 173 of valve 174 and pipe 175 has already been directed against the right hand end of motor 108, causing the piston therein to actuate valve element 106 of valve 100 to the left. When valves 70 and 100 have been so adjusted, fluid from pump p¹ flows through pipe 63, pipe 75, port 74, port 76, pipe 78, to the lower end of lid operating motor 18, through branch pipe 79 to the lower end of the second lid operating motor 23, and through choke coil 94 to the upper end of section 3ᵃ of unit 3. Thus, lid 12 is first moved upwardly and the material receiving chamber of unit 3 is ready to receive another charge of material after said lid is swung to an out-of-the-way position about rod 15. Owing to the delayed action produced by choke coil 94 pistons 10 and 11 are urged downwardly to retracted position, after lid 12 has been raised. Fluid from pump P², on the other hand, flows through pipe 67, pipe 102, port 101 of valve 100, port 104, pipe 110, to the lower end of section 4ᵃ, causing pistons 27 and 28 to move upwardly. Fluid also flows from pipe 110 to pipes 111 and 112 to the upper end of motors 33 and 39, causing pistons 34 and 38 respectively to actuate lid 29 downwardly to seal the upper end of the receiving chamber of unit 4. The fluid contained in the upper end of motors 18 and 23 now returned to makeup tank 61 through pipes 80, 81, port 77, passage 90, port 92, and pipe 91. Fluid from the lower end of section 3ᵃ of unit 3 also returns to make-up tank through pipe 82, pipe 80, valve 70 and pipe 91. In a like manner the fluid at the lower ends of motors 33 and 39, flows back to make-up tank 61 through pipes 113, 114, port 103, valve 100, and pipe 119. Fluid at the upper end of section 4ᵃ of unit 4 will now flow through bypass connection 116 and into pipe 113, and thence be returned to the make-up tank 61 through the connections just described.

As piston 28 of unit 4 moves upwardly, the materials in the receiving chamber thereof are forced through port 42 and into pipe 44, and thence through valve member 48 and discharge port 50 which in turn may be connected with any suitable receiving apparatus.

Figure 12:
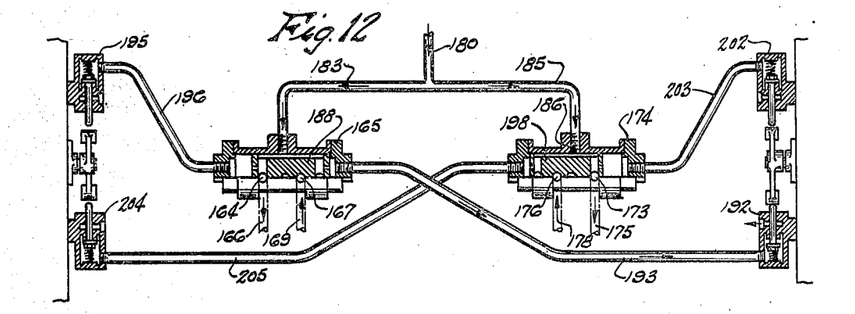
Figure 13:
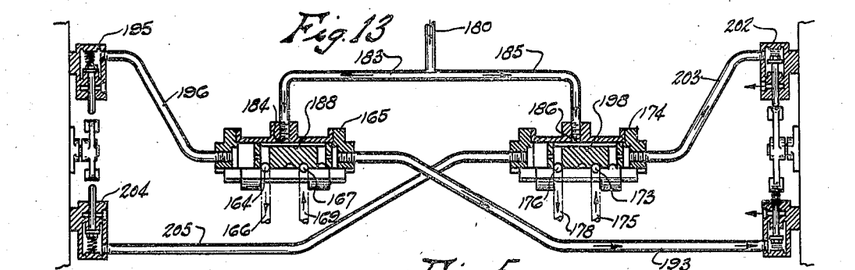

Fig. 11 shows the position, on an enlarged scale, of the air control valves when the apparatus assumes the position shown in Fig. 1. As piston 28 approaches its upper limit of travel, projections 252 on rod 241 engages tripping element 256, thereby swinging the same in a clockwise direction (Fig. 5) causing the arm 258 thereof to engage valve stem 260 of valve 192, to open the latter and thus connect the right hand end of valve member 165 to exhaust. Inasmuch as the left hand end of said valve is subjected to pressure communicated thereto through passage 217, valve element 188 will be shifted to the right. Fig. 12 shows the position of the parts at this stage of the operation. Fluid under pressure now discharges from valve 165 through port 164 and into pipe 166, which conducts it to the left hand end of motor 88, causing valve element 72 to be shifted to the right. Fluid from pump P¹ will now flow through pipes 63 and 75, valve 70, pipe 80, to the upper end of motor 23 and through pipe 81 to the upper end of motor 18, causing lid 12 to be moved downwardly to closed position. Fluid also flows to the lower end of section 3ᵃ through pipe 82, whereupon pistons 10 and 11 begin their upward travel. The fluid at the lower ends of motors 18 and 23 will now drain back to makeup tank 61 through pipes 78 and 79, valve 70, and pipe 91, as previously described. Fluid at the upper end of section 3ᵃ will now flow through bypass connection 95 and into pipe 79 and thence to tank 61 through the connections just described. Also, the fluid at the right hand end of motor 88, and at the lower end of motor 55 will now flow to exhaust through pipes 168 and 169, port 167, passage 214 of valve member 188, and port 207. At this point valve member 198 of valve 174 is in the position shown in Figs. 1 and 11, and consequently valve member 48 of valve 47 is still in the position shown in Fig. 1, and the action of piston 11 simply compresses the materials in the receiving chamber of unit 3, while piston 28 continues to feed material from the receiving chamber of unit 4. Upon further travel of pistons 27 and 28, arm 259 engages valve stem 261 of relief valve 202, and opens the latter, thereby reducing the presures at the right hand end of valve 174. Inasmuch as valve 204, is still closed, the pressure communicated to the left hand end thereof through passage 217 will urge valve member 198 to the right. The apparatus now assumes the position shown in Fig. 13 at which time both the valve elements 188 and 198 are in the right hand position of adjustment. Fluid now passes through pipe 185 to port 186 of valve 174, and thence to pipe 178, pipe 177, and into the left hand end of motor 108, causing the piston therein to shift valve element 106 of valve 100 to the right, and at the same time fluid from pipe 177 enters the uppere end of motor 56 urging the piston therein downwardly, causing valve element 48 to be shifted in the reverse direction, as shown in Fig. 6, thereby establishing communication between pipe 43 and discharge port 50, and at the same time closing port 46. Materials from unit 3 are now fed through valve 47, and inasmuch as the shifting of said valve takes place immediately upon completion of the feeding operation of piston 28, the changeover from unit 4 to unit 3 is instantaneous and as a result no interruption in the feeding process occurs. Fluid from pump P² now flows through pipe 67, pipe 102, valve 100, and pipe 113 to the lower end of motor 33 and through branch pipe 114 to the lower end of motor 39, causing the pistons 34 and 38 respectively, to move lid 29 upwardly. Fluid also enters the upper end of section 4ᵃ through choke coil 115, thereby urging pistons 27 and 28 downwardly. The operator now swings lid 29 to an out of the way position, as shown in Fig. 3, and the receiving chamber of unit 4 is loaded with another charge of material. Fluid from the lower end of section 4ᵃ now flows back to makeup tank 61 through pipe 110, port 104 of valve 100, and pipe 119. Fluid at the upper ends of motors 33 and 39 also flows back to makeup tank through pipes 112, 111, 110, valve 100, and pipe 119. After the receiving chamber of unit 4 has been recharged, lid 29 is swung back into operative position wherein hook 36 engages rod 37 and the unit is now ready for another feeding operation. As pistons 10 and 11 approach the limit of their upward travel, projection 242 engages tripping element 245, causing the latter to swing in a counter clockwise direction, whereby arm 246 engages valve stem 247 of valve 204, causing the latter to open, thereby relieving the pressure at the left hand end of valve 174, causing valve element 198 thereof to shift to the left, as previously described, while valve member 188 of valve 165 remains in the position shown in Fig. 13. The parts are now in the position shown in Fig. 14. Fluid under pressure discharges from valve 174 through pipe 175, and enters the right hand end of motor 108, causing valve element 106, of valve 100 to move to the left, as shown in Figs. 1 and 2, causing fluid under pressure from pump P² to enter the lower end of section 4ᵃ of unit 4 through pipes 67 and 102, valve 100, and pipe 110, and the upper ends of motors 33 and 39, through branch pipe 111 and 112. When this occurs lid 29 will be urged downwardly to closed position, while pistons 27 and 28 will begin their upward travel. Inasmuch as valve member 48 is still in the position shown in Fig. 6, piston 28 simply compresses the materials in the receiving chamber of unit 4, while piston 11 continues to feed the material from unit 3. Fluid at the upper end of section 4ᵃ will now flow back to supply tank 61 through bypass connection 116, pipe 113, valve 100, and pipe 119, as previously described, while the fluid at the lower ends of motors 35 and 40 has also drained back to said tank through pipes 113 and 114, valve 100 and pipe 119. The fluid at the left hand end of motor 108, and the fluid at the upper end of motor 56 will now flow to exhaust through pipes 177, 178, port 176, the transverse passage provided in the valve element 198, and the exhaust port provided at the opposite side of said valve. Upon further movement of pistons 10 and 11, projection 242 will actuate tripping element 245 a further distance, causing the arm 248 thereon to engage valve stem 249 of valve 195, and thereby open the latter to exhaust. When this occurs, the pressure at the left hand end of valve 165 will also be connected to exhaust, and inasmuch as valve 192 at this time is closed, the pressure exerted against the right hand end 216 thereof will cause the latter to shift to the left. The parts will now assume the positions shown in Figs. 1 and 11, and the cycle of operation of the apparatus as a whole has been completed.

It therefore is seen that a novel material feeding apparatus has been provided which enables one device to feed the materials while the other is being charged, and to thereafter close the ports leading from the feeding unit when the latter has reached its limit of movement, and to automatically cause the newly charged unit to continue the feeding operation. This process is repeated, and as a result a constant flow of material of a uniform density is fed from the apparatus.

While the embodiment herein shown and described is admirably adapted to fulfill the objects primarily stated, it is to be understood that the invention is not to be limited thereto, since it may be embodied in other forms, all coming within the scope of the claims which follow.

What is claimed is:

1. In a device of the class described, the combination of means for feeding materials at a predetermined rate, said means comprising a plurality of material-receiving chambers, an adjustable lid provided at one end of each of said chambers, a piston operative in each of said chambers for feeding materials therefrom, a valve for controlling the flow of materials from said chambers, means connecting said valve to the discharge end of each of said chambers, means for so adjusting said valve that the materials fed from said chambers will pass therethrough in a predetermined sequential order, and control means for each of said pistons causing operation thereof in the feeding direction prior to the adjustment of said valve, whereby said materials are compresed isn said chambers before feeding thereof is effected.

2. In a device of the class described, the combination of means for feeding materials at a predetermined rate, said means comprising a pair of material receiving chambers, an adjustable lid provided at one end of each of said chambers, a piston operative in each of said chambers for feeding the materials therefrom, an adjustable valve for controlling the flow of materials from said chambers, means for connecting said valve to the discharge end of each of said chambers, means for moving said valve to different positions of adjustment to alternately connect the same with said chambers, whereby when materials from one of said chambers have been fed therethrough, said valve will be adjusted to connect the other of said chambers thereto, and control means for each of said pistons causing operation thereof in the feeding direction prior to the adjustment of said valve to compress the materials in said chambers before feeding thereof is effected.

3. In a device of the class described, the combination of means for feeding materials at a predetermined rate, said means comprising a pair of receiving chambers, an adjustable lid provided at one end of each of said chambers a piston operative in each of said chambers for feeding the materials therefrom, an adjustable valve having a discharge port for controlling the flow of materials fed from said chambers, means connecting said valve to the discharge end of each of said chambers, automatic means for adjusting said valve to alternately connect said chambers with said discharge port thereof whereby a continuous flow of materials from said chambers will pass therethrough, and control means for each of said pistons causing operation thereof in the feeding direction prior to the adjustment of said valve to compress the materials in said chambers before feeding thereof is effected.

4. In a device of the class described, the combination of means for feeding materials at a predetermined rate, said means comprising a plurality of material receiving chambers, a piston operative in each of said chambers for feeding materials therefrom, an adjustable valve, having a discharge port and a pair of inlet ports, for controlling the flow of materials from said chambers, means for connecting one of said inlet ports with the discharge end of one of said cylinders, means connecting the other of said inlet ports with the discharge end of the other of said chambers, automatic means for adjusting said valve to alternately connect the discharge port thereof with said inlet ports whereby a constant flow of materials will pass through said valve, independent operating means for said pistons, means for controlling said operating means in such a manner that when one of said pistons is operated in the feeding direction, the other is retracted to permit the chamber associated therewith to receive a new charge of material, and automatic control means for conditioning the retracted piston for operation in the feeding direction prior to the completion of operation of the other piston in the feeding direction, whereby the materials in the recharged chamber will be compressed before feeding thereof is effected.

5. In a device of the class described, the combination of means for feeding materials at a predetermined rate, said means comprising a pair of material receiving chambers having an open end, a piston operative in each of said chambers for feeding materials therefrom, a pair of lids, one for closing the open end of each of said chambers, an adjustable valve operatively connected to the discharge ends of said cylinders through which the materials from said chambers are fed, means for actuating said pistons to feed the materials from said chambers, operating means for said lids, and means for controlling the operating means for said lids and said pistons whereby each of said lids will be actuated to closed position and retained in said position when the piston operating in the associated chamber is actuated in the feeding direction, and when said piston is retracted after a feeding operation the lid for the associated chamber will be actuated to open position.

6. In a device of the class described, the combination of means for feeding materials at a predetermined rate, said means comprising a plurality of material receiving chambers, a piston operative in each of said chambers for feeding the materials therefrom, each of said chambers having an open end for receiving charges of materials, a valve for controlling the flow of materials from said chambers, having a discharge port and a pair of inlet ports, means for connecting one of said inlet ports to the discharge end of one of said chambers, means for connecting the other of said inlet ports to the discharge end of the other of said chambers, a lid for closing the open end of each of said chambers, operating means for each of said lids for actuating the same to open and closed positions, motor means for operating each of said pistons, a pumping unit for actuating said motors, and control means for compelling operation of said motors in a predetermined order to effect a continuous feeding of materials through said valve, said control means also comprising means for shifting said valve to alternately connect the discharge port thereof with said inlet ports in accordance with the feeding operation of said pistons.

7. In a device of the class described, the combination of means for feeding materials at a predetermined rate, said means including a pair of material feeding chambers, each having a discharge port at one end thereof, and having an open end for the reception of charges of materials, a lid adapted to close the open end of each of said chambers, a valve for controlling the flow of material from said chambers, means connecting said valve with the discharge port of each of said chambers, a piston operative in each of said chambers for feeding the materials therefrom, a motor for adjusting said valve to alternately connect the discharge port thereof with the discharge ports of said chambers, motor means for actuating each of said pistons, motor means for actuating each of said lids to open and closed positions, a pumping unit including a pair of pumps, one of said pumps being provided for actuating said lid operating motors, and the piston operating in the motor associated with each of said chambers, valve means for controlling the flow of fluid from said pumps to said motors, a pair of control valves, one for each of said first mentioned valves, relief valves for controlling the operation of said control valves, and means operated by said pistons for actuating said relief valves to open position in a predetermined order, means for adjusting the stroke of said pumps, and means for varying the length of stroke of said pumps to regulate the discharges thereof, whereby the operation of said motors is correspondingly varied.

8. In a device of the class described, the combination of a pair of pistons, cylinders for said pistons, a pair of pumps for supplying fluid pressure to said cylinders, valve means for controlling the discharges of said pumps to said pistons whereby the direction of travel of the latter may be controlled, motor means for adjusting said valves, a pair of shiftable valves for controlling the operation of said valve adjusting motors, a series of relief valves operatively connected to said shiftable valves for controlling the operation thereof, and means actuated by said pistons for operating said relief valves in a predetermined order to control the operation of said shiftable valves.

9. In a device of the class described, the combination of means for feeding materials at a predetermined rate, said means comprising a plurality of material receiving chambers, a piston operative in each of said chambers for feeding materials therefrom, an adjustable valve, having a discharge port and a pair of inlet ports, for controlling the flow of materials from said chambers, means for connecting one of said inlet ports with the discharge end of one of said cylinders, means connecting the other of said inlet ports with the discharge end of the other of said chambers, automatic means for adjusting said valve to alternately connect the discharge port thereof with said inlet ports whereby a constant flow of materials will pass through said valve, independent operating means for said pistons, means for controlling said operating means in such a manner that when one of said pistons is operated in the feeding direction, the other is retracted to permit the chamber associated therewith to receive a new charge of material, and automatic control means for conditioning the retracted piston for operation in the feeding direction prior to the completion of operation of the other piston in the feeding direction, whereby the materials in the recharged chamber will be compressed before feeding thereof is effected, said automatic control means including a pair of shiftable control valves, a series of relief valves operatively connected to said control valves, and means operated by said pistons when they approach their limit of travel in one direction, for successively operating certain of said relief valves to control the operation of said control valves.

10. In a device of the class described, the combination with a pair of fluid motors, of a pair of pumps, one for actuating each of said motors, valve means associated with each of said pumps for controlling the direction of movement of the associated motors, means for shifting each of said valve means, automatic means for controlling the operation of said last mentioned means, said automatic means comprising a pair of shiftable control valves, a plurality of relief valves operatively connected to said shiftable control valves, and means for successively actuating certain of said relief valves to open position when one of said motors is actuated in one direction, and means for successively actuating other of said relief valves to open position when the other of said motors moves in one direction.

11. In a device of the class described, the combination of a pair of double-acting motors, each of said motors having a piston operating therein, a pair of pumps, one for actuating each of said pistons, a four-way valve disposed between each of said pumps and the associated motor for controlling the operation of the latter, a fluid motor associated with each of said four-way valves for actuating the latter to different positions of adjustment, a control valve for each of said motors, a pair of relief valves disposed adjacent each of said first mentioned motors, means operatively connecting said relief valves with said control valves, means for successively opening the relief valves associated with one of said pistons when the latter travels a predetermined distance in one direction to effect a reverse operation of the four-way valve associated with that motor, and means for successively operating the relief valves associated with the other of said first mentioned motors when the piston thereof travels a predetermined distance in one direction to further control the operation of said control valves, and thereby effect an adjustment of the other of said four-way valves to change the direction of operation of the associated motor.

12. In a device of the class described, the combination of means for feeding materials at a predetermined rate, said means comprising a plurality of material receiving chambers, a piston operative in each of said chambers for feeding materials therefrom, an adjustable valve, having a discharge port and a pair of inlet ports, for controlling the flow of materials from said chambers, means for connecting one of said inlet ports with the discharge end of one of said cylinders, means connecting the other of said inlet ports with the discharge end of the other of said chambers, automatic means for adjusting said valve to alternately connect the discharge port thereof with said inlet ports whereby a constant flow of materials will pass through said valve, independent fluid motor means for operating said pistons, independent pump means for actuating said fluid motor means, a valve disposed between each of said pumps and its associated motor for controlling the direction of movement of the latter, means for shifting said valves to different positions of adjustment, and automatic control means for each of said valves which functions to so control the operation of said motors that when one of said pistons is actuated in the feeding direction the other is retracted to permit the chamber associated therewith to receive a new charge of material, and to condition the motor for actuating the piston associated with the recharged chamber for operation prior to the completion of operation of the other piston in the feeding direction, whereby the materials in said recharged chamber will be compressed before feeding thereof is effected.

13. In a device of the class described, the combination of means for feeding materials at a predetermined rate, said means comprising a plurality of material receiving chambers, a piston operative in each of said chambers for feeding materials therefrom, an adjustable valve, having a discharge port and a pair of inlet ports, for controlling the flow of materials from said chambers, means for connecting one of said inlet ports with the discharge end of one of said cylinders, means connecting the other of said inlet ports with the discharge end of the other of said chambers, automatic means for adjusting said valve to alternately connect the discharge port thereof with said inlet ports whereby a constant flow of materials will pass through said valve, independent fluid motor means for operating said pistons, independent pump means for actuating said fluid motor means, a valve disposed between each of said pumps and its associated motor for controlling the direction of movement of the latter, means for shifting said valves to different positions of adjustment, automatic control means for each of said valves which functions to so control the operation of said motors that when one of said pistons is actuated in the feeding direction the other is retracted to permit the chamber associated therewith to receive a new charge of material, and to condition the motor for actuating the piston associated with the recharged chamber for operation prior to the completion of operation of the other piston in the feeding direction, whereby the materials in said recharged chamber will be compressed before feeding thereof is effected, said automatic control means including a pair of shiftable control valves, a series of relief valves operatively connected to said control valves, and means operated by said pistons when they approach their limit of travel in one direction for successively operating said relief valves to control the operation of said shiftable control valves.

14. In a device of the class described, the combination of means for feeding materials at a predetermined rate, said means comprising a pair of material receiving chambers, each of said chambers having side and end walls and being open at one end, a discharge port provided in one of the end walls of each of said chambers, an adjustable valve operatively connected to said discharge ports, a material feeding piston operative in each of said chambers, a cylinder integral with each of the side walls of each of said chambers, a piston operative in each of said cylinders, a piston rod connected to each of said last mentioned pistons and extending upwardly beyond said chambers, a pair of lids for closing the open ends of said chambers, means for pivotally mounting the lid for one of said chambers on one of the piston rods associated therewith, a hook provided at the other end of said lid adapted to engage the other of the piston rods associated with said chamber, means for pivotally mounting the other of said lids to one of the piston rods associated with the other of said chambers, a hook provided on said last mentioned lid adapted to engage the other of said piston rods associated with said last mentioned chamber, whereby said lids may be swung about their pivotal connections to an out of the way position to permit said chambers to receive charges of materials, means for actuating said lid operating pistons in either direction, operating means for said material feeding pistons, and control means for each of said last mentioned pistons causing operation thereof in the feeding direction prior to the adjustment of said valve, whereby said materials are compressed in said chambers before feeding thereof is effected.

HENRY W. LANDENBERGER.